(12) United States Patent
Fricker et al.

(10) Patent No.: US 8,048,942 B2
(45) Date of Patent: *Nov. 1, 2011

(54) PROCESS FOR THE PRODUCTION OF A SUPERABSORBENT POLYMER

(75) Inventors: Daniel Fricker, Roeschwoog (FR); Herbert Gartner, Baden-Baden (DE); Marc Hager, Haguenau (FR); Jörg Harren, Krefeld (DE); Hans-Peter Kohler, Bühlertal (DE); Harald Plöchinger, Bühl (DE)

(73) Assignee: Evonik Stockhausen GmbH, Krefeld (DE)

( * ) Notice: Subject to any disclaimer, the term of this patent is extended or adjusted under 35 U.S.C. 154(b) by 188 days.

This patent is subject to a terminal disclaimer.

(21) Appl. No.: 12/575,146

(22) Filed: Oct. 7, 2009

(65) Prior Publication Data

US 2010/0099799 A1    Apr. 22, 2010

Related U.S. Application Data

(60) Provisional application No. 61/103,663, filed on Oct. 8, 2008.

(51) Int. Cl.
    C08G 18/08    (2006.01)
(52) U.S. Cl. ........................................ 523/343; 523/348
(58) Field of Classification Search .................. 523/343, 523/348
    See application file for complete search history.

(56) References Cited

U.S. PATENT DOCUMENTS

| | | | |
|---|---|---|---|
| 4,466,983 A | 8/1984 | Cifrese et al. |
| 4,656,232 A | 4/1987 | Nakaki et al. |
| 4,734,478 A | 3/1988 | Tsubakimoto et al. |
| 4,857,610 A | 8/1989 | Chmelir et al. |
| 4,893,999 A | 1/1990 | Chmelir et al. |
| 5,298,570 A | 3/1994 | Tahara et al. |
| 5,314,420 A | 5/1994 | Smith et al. |
| 5,342,889 A | 8/1994 | Sullivan et al. |
| 5,342,899 A | 8/1994 | Graham et al. |
| 5,629,377 A | 5/1997 | Burgert et al. |
| 6,323,252 B1 | 11/2001 | Gartner et al. |
| 6,444,744 B1 | 9/2002 | Fujimaru et al. |
| 6,602,950 B1 | 8/2003 | Dentler et al. |
| 6,620,889 B1 | 9/2003 | Mertens et al. |
| 6,710,141 B1 | 3/2004 | Heide et al. |
| 6,727,345 B2 | 4/2004 | Kajikawa et al. |
| 6,831,142 B2 | 12/2004 | Mertens et al. |
| 6,835,783 B1 | 12/2004 | Gartner et al. |
| 6,911,499 B1 | 6/2005 | Brehm et al. |
| 6,916,864 B2 | 7/2005 | Gartner et al. |
| 6,987,151 B2 | 1/2006 | Gartner et al. |
| 7,179,862 B2 | 2/2007 | Mertens et al. |
| 7,285,599 B2 | 10/2007 | Mertens et al. |
| 7,342,058 B2 | 3/2008 | Peppmoller et al. |
| 7,378,453 B2 | 5/2008 | Nogi et al. |
| 7,473,470 B2 | 1/2009 | Ishizaki et al. |
| 7,625,957 B2 | 12/2009 | Harren et al. |
| 7,833,624 B2 | 11/2010 | Harren et al. |
| 2003/0207997 A1 | 11/2003 | Mertens et al. |
| 2004/0186229 A1 | 9/2004 | Heide et al. |
| 2005/0171235 A1 | 8/2005 | Harren et al. |
| 2007/0066167 A1 | 3/2007 | Wada et al. |
| 2007/0078231 A1 | 4/2007 | Shibata et al. |
| 2007/0123658 A1 | 5/2007 | Torii et al. |
| 2007/0129495 A1 | 6/2007 | Mertens et al. |
| 2008/0194863 A1 | 8/2008 | Weismantel et al. |
| 2008/0200623 A1 | 8/2008 | Weismantel et al. |
| 2008/0214749 A1 | 9/2008 | Weismantel et al. |
| 2009/0234314 A1 | 9/2009 | Nakamura et al. |
| 2010/0036004 A1 | 2/2010 | Harren et al. |
| 2010/0105808 A1 | 4/2010 | Fricker et al. |
| 2010/0105809 A1 | 4/2010 | Fricker et al. |
| 2010/0130950 A1 | 5/2010 | Harren et al. |
| 2010/0209379 A1 | 8/2010 | Furno et al. |

FOREIGN PATENT DOCUMENTS

| | | |
|---|---|---|
| CA | 1258338 A1 | 8/1989 |
| DE | 3432690 A1 | 3/1985 |
| DE | 3544770 A1 | 6/1987 |
| DE | 19642761 A1 | 4/1998 |
| DE | 19846412 A1 | 4/2000 |
| DE | 102005014291 A1 | 9/2006 |
| DE | 102005042604 A1 | 3/2007 |
| EP | 688340 A1 | 12/1995 |
| EP | 827753 A2 | 3/1998 |
| EP | 1470905 A1 | 10/2004 |
| EP | 2116571 A1 | 11/2009 |
| EP | 2163302 A1 | 3/2010 |
| JP | 64033158 | 3/1989 |
| JP | 5086251 | 4/1993 |
| JP | 5239127 | 9/1993 |
| JP | 11322846 | 11/1999 |
| JP | 2000230129 | 8/2000 |
| JP | 2000313796 | 11/2000 |
| JP | 2001011328 | 1/2001 |

(Continued)

OTHER PUBLICATIONS

European Search Report mailed on Aug. 20, 2010 in European Patent Application No. EP10003452.
European Search Report mailed on Mar. 10, 2009 in European Application No. 08017545.8.
European Search Report mailed on Mar. 10, 2009 in European Application No. 08017544.1.
International Search Report mailed on Aug. 12, 2008 in PCT/JP2008/062041.

(Continued)

Primary Examiner — Edward Cain
(74) Attorney, Agent, or Firm — Smith Moore Leatherwood LLP

(57) ABSTRACT

The present invention relates to a process for the production of a superabsorbent polymer comprising preparing an aqueous mixture of monomers selected to provide after polymerization a superabsorbent polymer; feeding said monomer mixture to a reactor; subjecting the aqueous monomer mixture in the reactor to free-radical polymerization to obtain a superabsorbent polymer gel; removing the superabsorbent polymer from the reactor; and working-up the superabsorbent polymer removed from the reactor to obtain a final product, whereby a basic aqueous medium comprising carbonate and/or hydrogen carbonate is fed to the superabsorbent polymer gel.

14 Claims, 1 Drawing Sheet

FOREIGN PATENT DOCUMENTS

Figure 1:
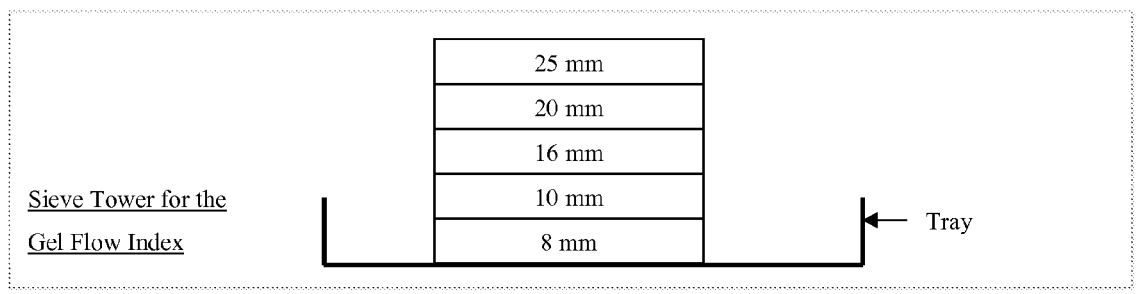

| | | |
|---|---|---|
| JP | 2003206381 | 7/2003 |
| JP | 2004300425 | 10/2004 |
| JP | 2005111474 | 4/2005 |
| JP | 2006055833 | 3/2006 |
| JP | 2007119757 | 5/2007 |
| WO | 9305080 A1 | 3/1993 |
| WO | 9420547 A1 | 9/1994 |
| WO | 9816308 A1 | 4/1998 |
| WO | 0116197 A1 | 3/2001 |
| WO | 0138402 A1 | 5/2001 |
| WO | 03000621 A1 | 1/2003 |
| WO | 03004237 A1 | 1/2003 |
| WO | 03022896 A1 | 3/2003 |
| WO | 2004003036 A1 | 1/2004 |
| WO | 2006062609 A2 | 6/2006 |
| WO | 2006134085 A1 | 12/2006 |
| WO | 2007028748 A1 | 3/2007 |

OTHER PUBLICATIONS

International Search Report mailed on May 1, 2008 in PCT/JP2008/051777.
European Search Report mailed on Mar. 10, 2009 in European Application No. 08017543.3.
Daniel Fricker et al., U.S. Appl. No. 61/103,652, filed Oct. 8, 2008.
Daniel Fricker et al., U.S. Appl. No. 61/103,670, filed Oct. 8, 2008.
Jorg Harren et al., U.S. Appl. No. 10/532,280, filed Aug. 19, 2005.
Jorg Harren et al., U.S. Appl. No. 12/525,955, filed Aug. 5, 2009.
Fricker et al., U.S. Appl. No. 12/575,071, filed Oct. 7, 2009.
Fricker et al., U.S. Appl. No. 12/575,124, filed Oct. 7, 2009.
Gartner et al., U.S. Appl. No. 12/942,633, filed Nov. 9, 2010.

PROCESS FOR THE PRODUCTION OF A SUPERABSORBENT POLYMER

This application claims the benefit of U.S. Provisional Application No. 61/103,663 filed Oct. 8, 2008, the subject matter therein incorporated by reference. Embodiments of the present invention relates to a process for the production of a superabsorbent polymer.

BACKGROUND OF THE INVENTION

The preparation of water-absorbent polymers is, for example, summarized in "Modern Superabsorbent Polymer Technology" F. L. Buchholz and A. T. Graham, Wiley-VCH, 1998, or in Ullmann's Encyclopedia Industrial Chemistry, $6^{th}$ ed. vol. 35 pp 73-103. The preferred preparation process is the solution or gel polymerization. When using this technology usually a monomer mixture is prepared which is discontinuously neutralized and then transferred into the polymerization reactor and is then discontinuously or continuously polymerized to form a polymer gel which is in case of a stirred polymerization comminuted. The polymer gel is subsequently dried, ground, and sieved, and optionally a surface treatment is applied.

Methods of continuous polymerization are, for example, described in WO-A-01/38402, WO-A-03/004237, WO-A-03/022896 and WO-A-01/16197.

WO-A-03/022896 discloses a continuous process for the preparation of superabsorbent polymers in a reactor system comprising at least three zones, wherein the first zone is an initiation zone to which an aqueous monomer mixture comprising an initiation system is fed under conditions to initiate the polymerization, the second zone is a gel-phase zone, and the third zone is a granulation zone. According to a preferred embodiment the reactor is operated under vacuum and any water contained in the vacuum line is condensed and the condensate is recycled to the third zone to enhance the flowability of the polymer gel in the third zone.

EP-A 1 470 905 discloses a method for disintegrating a hydrate polymer by disintegrating a hydrate polymer having a solid content in the range of 50-70% by weight with a screw extruder while supplying 0.1-30 parts by weight of water per 100 parts of the polymer to the extruder. Since the product of disintegration is prevented from inducing mutual adhesion, it does not form masses of conglomeration when it is dried.

Although the measures suggested in the above discussed prior art references lead to some improvements in the handling of the superabsorbent gel polymer in the drying process, there is still a need in the industry to further improve processability of superabsorbent polymer gels in a process for the preparation of superabsorbent polymers. Thus, the object of the present invention is to provide a process for the preparation of superabsorbent polymers, whereby the flowability of the polymer gel in further improved.

SUMMARY OF THE INVENTION

This problem has been addressed by a process for the production of a superabsorbent polymer comprising:
(a) preparing an aqueous mixture of monomers selected to provide after polymerization a superabsorbent polymer,
(b) feeding said monomer mixture to a reactor,
(c) subjecting the aqueous monomer mixture in the reactor to free-radical polymerization to obtain a superabsorbent polymer gel,
(d) removing the superabsorbent polymer from the reactor, and
(e) working-up the superabsorbent polymer removed from the reactor to obtain a final product,
whereby a basic aqueous medium comprising carbonate and/or hydrogen carbonate is fed to the superabsorbent polymer gel.

According to a preferred embodiment of the present invention working-up step (e) encompasses:
(A) transferring the superabsorbent polymer gel to a subsequent process step according to (B) if at least one of the process steps according to (B) is performed;
(B) optionally any of the following steps and combinations thereof in any order:
  (1) sizing the superabsorbent polymer gel;
  (2) granulating the superabsorbent polymer gel;
  (3) maintaining the superabsorbent polymer gel in a gel hold tank;
(C) transferring the superabsorbent polymer gel to a drying device; and
(D) drying the superabsorbent polymer gel,
the basic aqueous medium being fed to the superabsorbent polymer gel in any of the process steps defined in (c) and (e(A) to e(C)).

Preferably the basic aqueous medium comprises an aqueous scrubber solution that is obtained in that at least one off-gas stream removed from any stage of the process is subjected to scrubbing with a basic aqueous solution prior to venting.

Any vent streams generated in the progress of the process of the present invention may be treated prior to their release to the atmosphere in order to limit the emission of the plant to the required standards. Such vent streams may be the inert gas stream which is used to deoxygenate the monomer solution, the vent stream from the reactor, from gel sizing and the major gas stream resulting from the gel drying operation. The vent streams from the storage tanks, in particular from the acrylic acid tanks, and optionally gas streams from the product post-treatment processes may also be directed to the scrubber for purification. The vent streams contain preferably carbon dioxide, either due to the use of carbon dioxide as inert gas or due to the presence of air in the respective vent streams.

According to one embodiment the scrubber comprises a vertical column packed with filling material, such as Raschig rings and diluted caustic is sprayed from the top onto the packing of the column and flows down through the packing material into the bottom area of the scrubber. For purification the vent streams are fed to the bottom of the column and on its way to the top of the column the gas stream is finely divided by the packing and the impurities are taken up by the aqueous phase.

The scrubber water that is when freshly prepared applied to the scrubber may comprise up to about 5 wt. % of sodium hydroxide in order to be able to reliably remove all the traces of acrylic acid and other impurities from the vent streams. Some of the originally fed sodium hydroxide is, however, converted into carbonates or hydrogen carbonates resulting from the contact of the diluted caustic in the scrubber with the carbon dioxide in the vent stream. Therefore, the scrubber water as removed from the scrubber contains some residual caustic and preferably from about 4 wt. % to about 10 wt. % carbonates or hydrogen carbonates. The total solids content of the scrubber solution may be in the range of about 10 wt. %. A portion thereof may consist of the superabsorbent fines dust which is carried in by the vent stream from the gel dryers. Furthermore the ethylenically unsaturated monomers used in the monomer mixture especially acrylic acid may be present in amounts of up to about 4 wt. %; usually it contains acrylic acid in the range of about 0.5 to about 2 wt. %. As the most crucial impurities are seen to be calcium and iron ions, acetic and formic acid, inhibitors and derivatives of it, and other impurities.

A further concern of recycling scrubber water is its brown color which might discolor the final product if recycled to the process step.

It has now been surprisingly discovered that the scrubber water can be recycled as basic aqueous medium to the polymer gel. As explained above, the scrubber water contains about 4 wt. % to about 10 wt. % of carbonate and/or hydrogen carbonate and is, therefore, well suited as a source for carbonate or hydrogen carbonate according to the present invention. Surprisingly, despite the numerous additional impurities that were thought to possibly adversely affect the stability of the process and/or the product quality no such adverse effects could be detected.

Thus, the present invention provides for a process for the preparation of superabsorbent polymers wherein all the process streams containing valuable materials can be effectively recycled to the process without jeopardizing process stability and product quality.

The process of the present invention can be run as a batch process or a continuous process, whereby a continuous process is particularly preferred. In the preferred embodiment the monomer mixture is continuously fed to the reactor and the superabsorbent polymer is continuously removed from the reactor.

FIGURE

The foregoing and other features, aspects and advantages of the present invention will become better understood with regard to the following description, claims, and the drawing where:

FIG. 1 is a side view showing a sieve stack in a plastic tray.

DETAILED DESCRIPTION OF THE PRESENT INVENTION

The present invention involves the polymerization of a suitable monomer mixture in order to produce a superabsorbent polymer in a free radical polymerization process. The superabsorbent polymers prepared by the process of the present invention are water-swellable and lightly crosslinked polymers and can be selected from the known hydrophilic polymers which are capable of absorbing large quantities of fluids. Preferred water-absorbent polymers are water-absorbent polymers that contain carboxyl moieties. Preferably at least about 0.01 equivalent of carboxyl groups are present per 100 g of the water-absorbent polymer. Among preferred carboxyl-containing water-absorbent polymers are partially neutralized products of starch-acrylic acid or polyvinyl alcohol graft copolymers, crosslinked products of hydrolysates of acrylamide copolymers, partially neutralized products of polyacrylic acids and crosslinked products of partially neutralized polyacrylic acids.

According to one embodiment of the present invention the monomer mixture comprises at least one ethylenically unsaturated acid and at least one monomer bearing at least two ethylenically unsaturated groups that function as a covalent crosslinker. Suitable $\alpha, \beta$-ethylenically unsaturated acids include, for example, acrylic acid, methacrylic acid, crotonic acid, isocrotonic acid, itaconic acid and 2-acrylamido-2-methyl-1-propane sulfonic acid. These acids can be used in the acidic form, but it is more preferred to use the $\alpha, \beta$-ethylenically unsaturated acids in their at least partially neutralized form as alkali metal salts and ammonium salts.

The preferred unsaturated acids include acrylic acid and methacrylic acid in their respective salt forms, such as alkali metal or ammonium salts. Optionally minor amounts of other water-soluble unsaturated monomers, such as alkyl esters of the acid monomers including, for example, methylmethacrylate, methylacrylate, acrylamide or methacrylamide (meth)acrylates of polyethyleneglycol methyl ether may be present in the monomer mixture. The monomers are employed in aqueous solution, preferably in amounts ranging from about 10 wt % to about 80 wt % based on the total weight of the aqueous monomer solution. Preferably the amount of monomer ranges from about 15 wt % to about 60 wt % based on the total weight of the aqueous monomer solution. In addition, certain grafting polymers such as, for example, polyvinyl alcohol, starch and water-soluble or swellable cellulose ethers may be employed to prepare the products. Such grafting polymers when employed are used in amounts of up to about 10 wt % based on the $\alpha, \beta$-ethylenically unsaturated monomer.

The water-absorbent polymer is preferably lightly covalently crosslinked to render it water-insoluble and water-swellable. The desired crosslinked structure can be obtained by including into the monomer mixture a crosslinking agent possessing at least two polymerizable double bonds in the molecular unit. The crosslinking agent is employed in an amount effective to covalently crosslink the water-soluble polymer. The preferred amount of crosslinking agent is determined by the desired degree of absorption capacity and the desired strength to retain the absorbed fluid that is the desired absorption under load (AUL). The crosslinking agent advantageously is used in amounts ranging from about 0.0005 to about 5 parts by weight per 100 parts by weight of the $\alpha, \beta$-ethylenically unsaturated monomer used. More preferably the amount ranges from about 0.1 part by weight to about 1 part by weight per 100 parts by weight of the $\alpha, \beta$-ethylenically unsaturated monomer. Usually if an amount of higher than about 5 parts by weight of crosslinking agent per 100 parts of monomer is used the polymers will have a crosslinking density that is too high and will exhibit reduced absorption capacity and increased AAP. If the crosslinking agent is used in amounts of less than about 0.0005 parts by weight per 100 parts of monomer the polymer usually has a crosslinking density that is too low and when contacted with the fluid to be absorbed becomes sticky and exhibits a lower initial absorption rate.

While the covalent crosslinking agent preferably is soluble in the aqueous solution of the $\alpha, \beta$-ethylenically unsaturated monomer the crosslinking agent may be merely dispersed in such a solution. Examples of suitable dispersing agents include carboxymethyl cellulose suspending aids, methyl cellulose, hydroxypropyl cellulose and polyvinyl alcohol. Such dispersing agents are advantageously provided at a concentration between about 0.0005 and about 0.1 wt % based on the total weight of $\alpha, \beta$-ethylenically unsaturated monomer.

Suitable covalent crosslinking agents include compounds having in one molecule two to four groups selected from the group consisting of $CH_2=CHCO-$, $CH_2=C(CH_3)CO-$ and $CH_2=CH-CH_2-$. Exemplary covalent crosslinking agents include diallylamine; triallylamine; diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; tetra-acrylate and tetramethacrylate of pentaerythritol; allyl methacrylate; and tetraallyloxyethane; and acrylates of the highly ethoxylated derivatives of trimethylolpropane or pentaerythritol having 3 to 30 ethylene oxide units, such as highly ethoxylated trimethylol propane triacrylate, tetra-acrylate and tetramethacrylate of pentaerythritol, and allyl methacrylate. Mixtures of covalent crosslinking agents can be employed.

The polymerization may be carried out using acid monomers that are not neutralized or that have been fully or partially neutralized prior to the polymerization. Neutralization is conveniently achieved by contacting the aqueous monomer solution with an amount of base sufficient to neutralize between about 10% and about 95% of the acid groups present in the acid monomers. Preferably the amount of base will be sufficient to neutralize between about 40% and about 85%, and most preferably between about 55% and about 80% of the acid groups present in the acid monomers.

Suitable compounds that are useful to neutralize the acid groups of the monomers include those bases that will sufficiently neutralize the acid groups without having a detrimental effect on the polymerization process. Examples of such compounds include alkali metal hydroxides, alkali metal carbonates and hydrogen carbonates.

A conventional vinyl addition polymerization initiator may be used in the polymerization of the water-soluble monomers and the crosslinking agent. A free-radical polymerization initiator that is sufficiently soluble in the monomer solution to initiate polymerization is preferred. For example, water-soluble persulfates such as potassium persulfate, ammonium persulfate, sodium persulfate, and other alkali metal persulfates, hydrogen peroxide and water-soluble azo-compounds such as 2,2'-azobis-(2-amidinopropane)hydrochloride may be used. So-called redox initiator systems such as hydrogen peroxide or sodium persulfate which can be used as oxidizing component can be combined with reducing substances such as sulfites, amines or ascorbic acid. The amount of initiator used may range from about 0.01 wt % to about 1 wt %, preferably about 0.01 wt % to about 0.5 wt % based on the total weight of the $\alpha, \beta$-ethylenically unsaturated monomer.

Furthermore, it is possible and even preferred, to recycle fines of superabsorbent polymers into the preparation process. As fines are considered those particles, which are too small for the desired application as defined by the product specification. This undesired product fraction is, therefore, removed from the granulated polymer. The fraction of fines can be determined by sieving using EDANA Standard Test Method WSP 220.2(5). The test is incorporated herein by reference. Fines can also be generated by applying a fluidized bed for heating particulate superabsorbent polymers. By the hot air stream particles may be elutriated having a diameter of up to about 300 µm. Polymer particles having a particle size of less than about 300 µm, or less than about 200 µm are defined as fines in accordance with the present invention.

The fines may be recycled to any stage of the process according to the present invention but, as will be discussed in more detail below, it is particularly preferred to recycle the fines into the monomer mixture. Furthermore, other suitable additives may be added to the monomer mixture at a suitable point during the process, as will be discussed below. Other additives may be selected, for example, from alkali metal chlorate, polyethylene glycol, aqueous solution of pentasodium salt of diethylene triamine pentaacidic acid (Versenex 80), water insoluble organic or inorganic powder such as water insoluble metal oxides like silica or zinc oxide, surfactants, dispersing aids, agents to control odor like silver salts or other processing aids.

Without wanting to be limited, the present invention will now be discussed in more detail with respect to acrylic acid as most preferred ethylenically unsaturated acid for the preparation of superabsorbent polymers. But a person skilled in the art will appreciate that the same process may be conducted using different monomers or mixture of monomers.

According to a preferred embodiment of the present invention the liquid aqueous monomer mixture is preferably an aqueous monomer solution that is continuously prepared in a circulation line with an integrated buffer vessel. Several production lines can be served from this system for preparing the monomer solution. Upstream of the circulation line an inline mixing system with integrated heat exchanger for the dilution of the caustic (aqueous sodium hydroxide solution) from about 50% to about 20% with deionized water, or preferably with process water, and for the addition of additives is provided.

The circulation of the monomer solution is forced by a pump. The pump sucks the monomer solution from the bottom side of the buffer vessel and conveys it via circulation lines and at least one integrated heat exchanger back to the top side of the vessel. Between the discharge point of the vessel and the circulation pump there is injected into the circulation line in direction of the flow the diluted caustic first, followed by the injection of at least one part of the total required amount of acrylic acid. Preferably about 70% of the total required amount of acrylic acid or less is injected at this point so that the monomer solution in the buffer vessel has a pH of at least about 8 allowing the acrylic acid dimers and oligomers of the acrylic acid to be cracked into acrylic acid and $\beta$-hydroxy propionic acid. The entire degree of neutralization (DN) of the unsaturated acid, especially acrylic acid in the monomer solution prior to polymerization is in the range of about 50% to about 85%, more preferably between about 65% and about 75%. More than about 70% or even all of acrylic acid needed for the desired degree of neutralization may be fed at this point of the process in case that the used acrylic acid has a low dimer concentration.

The monomer solution in the circulation line between acrylic acid addition point and heat exchangers can reach temperatures of up to about 80° C. The heat exchangers control the temperature of the solution in the rest of the circulation line and in the buffer vessel in the range from about 4° C. to about 40° C. The heat exchangers may be operated with either cooling water, by a glycol-water system or by other cooling media.

The buffer vessel and the circulation lines consist of a suitable type of stainless steel. The surfaces on the product side are optionally post-passivated or provided with a suitable coating (Teflon, PTFE, cam-resist etc.). Optionally the vessel and the lines consist of a suitable plastic such as PE or PP.

The amount of monomer solution for the continuously operated polymerization process is continuously taken from the circulation line of the monomer preparation system in flow direction after the last heat exchanger but before the injection of the caustic and is transferred to the reactor. At this point the monomer solution containing dissolved oxygen in general is saturated with dissolved oxygen. The transfer line can be of the same material and construction as the circulation line. The transferred monomer solution has preferably a temperature in the range of about 4° C. to about 35° C. and its transfer rate to the reactor in one embodiment of the present invention equals a fraction in the range of about 5% to about 50% of the flow rate in the circulation line. In order to avoid the inhibiting effect of oxygen on the free-radical polymerization process the monomer mixture is preferably deoxygenized by directing an inert gas stream through the monomer mixture in order to remove the dissolved oxygen from the aqueous monomer mixture. Additionally the monomer mixture is fed in an inert gas stream to the reactor. Suitable inert gases for deoxygenating and the feed stream are those known from the prior art, for example nitrogen, carbon dioxide, or noble gases like argon, whereby nitrogen is particularly preferred.

The possibly still missing fraction of the ethylenically unsaturated acid, for example, acrylic acid in the monomer solution at this point is preferably about 30% of the total required amount. The remaining monomer, crosslinkers, at least some of the required initiators such as hydrogen peroxide, sodium persulfate and optionally a coinitiator, and optionally further required additives can be injected into the transfer line at the suitable position.

In case a redox initiation system is used the oxidative component of the initiating system, like hydrogen peroxide is added at an early point in the transfer line in flow direction and the reductive component of the initiating system, like ascorbic acid or salts thereof is added at the very end of the transfer line, i.e. just prior to the point where the monomer mixture enters the reactor. Alternatively the reductive component is directly injected to the reactor at a position in proximity to the entry point of the monomer mixture, such that it homogenizes with the monomer mixture in the reactor. But due to better homogenization in the transfer line it is preferred to add the reductive component at the very end of the transfer line just prior to entry into the reactor.

According to one preferred embodiment of the present invention the sequence of addition may be in the following order. After the monomer solution has been withdrawn from the circulation line, as explained above, the remaining amount of, for example, acrylic acid in order to achieve the desired total degree of neutralization and to obtain an acidic liquid aqueous monomer mixture is added. Then the crosslinker is added, optionally followed by, for example, sodium chlorate, followed by the oxidative component of the redox initiation system, like hydrogen peroxide and/or sodium persulfate. Thereafter optionally the fines of superabsorbent polymer as defined above are added. Finally, at the end of the transfer line just prior to entry into the reactor, the reductive component of the redox initiator, like ascorbic acid is injected. According to a preferred embodiment of the present invention the transfer line is equipped with at least one, preferably several inline mixers in order to obtain a homogenous distribution of the added components in the monomer solution. The inline mixers may be in the form of at least one disk having an eccentrically arranged boring of a suitable size for providing turbulent flow. Preferably several of those disks are inserted in series such that the holes are arranged in a staggered way so that a homogenous monomer solution is achieved.

Furthermore, an inert gas feed stream may be introduced into the head space in the reactor in order to facilitate removal of the oxygen-containing gas phase from the polymerization reactor. The same inert gases as described above for deoxygenating and the feed stream may be used.

If fines are added to the monomer solution the portion of fines to be recycled to the process is about 2 wt % to about 20 wt %, preferably about 5 wt % to about 18 wt % based on the weight of the ethylenically unsaturated acid, for example, acrylic acid in the reaction mass. The advantage of recycling the fines into the monomer solution is that the particles get integrated and firmly bound in the polymer matrix obtained by polymerization of the monomer solution containing the dispersed fines. Particularly in process operations downstream, such as grinding, sieving and polymer post-treatment such recycled fines will no more separate from the polymer product.

Polymerization is usually prevented by the additional inhibitors, and commercially available acrylic acid is generally stabilized by about 200 ppm of hydroquinone monomethylether (MEHQ). But even if MEHQ is present it is possible that undesired premature polymerization of the monomer solution occurs caused by e.g. traces of metal ions, like iron in the monomer solution, and by shear forces, and particularly by the action of the initiators. This can cause fouling in the monomer solution preparation system and even immediate blockage of the transfer line to the reactor. Furthermore, in order to counteract the effect of traces of metal ions, like iron ions, a chelating agent capable of chelating metal ions may be added to the monomer mixture.

As reactors for the process of the present invention any suitable reactor for a solution and gel polymerization of superabsorbent polymers as known from the prior art can be used. Particularly preferred are reactors that are capable of mixing, kneading and forwarding the reaction mass through the reactor within a desirable time frame. Particularly preferred are continuous kneaders and extruders. Particularly advantageous for the purpose of the present invention are those reactors containing two or more screws or kneading shafts that function at least in part to convey the vessel content along the axis of the vessel. In a preferred embodiment one of the shafts acts as a kneading shaft and the other acts as cleaning shaft. The rotation speed of the two shafts may be different although the speed can be the same for both shafts. Preferably these shafts rotate in opposite directions and the radius of the shafts is overlapping. In a preferred embodiment the two shafts are at least substantially parallel to each other. However, it is also possible to apply a vessel having more than two shafts, a vessel with shafts that rotate in the same direction, a vessel in which the radius of the shafts does not overlap, a vessel in which the shafts are not at least substantially parallel, or any combination of these. Suitable reactors are available, for example, from List AG, CH-4422 Alsdorf, Switzerland, especially suitable is the Conti-Version of the Opposite-Rotating-Processor (ORP), the Discoterm Conti (DTP), the Co-Rotating Processor (CRP) and (AP) as well as the processor of the CRK type. Suitable kneader reactors are available from Buss AG, Hohenrainstrasse 10, 4133 Pratteln (Switzerland). Other suitable reactors are those described in DE-OS 34 32 690. Also particularly preferred for polymerization are apparatuses as described in DE-OS 3544 770, disclosing belt reactors having an endless conveyer belt on which polymerization is continuously performed.

If a belt reactor is employed in the process of the present invention addition of the basic aqueous medium to the gel on the conveyer belt is in principle possible, but difficulties with homogenization may be encountered. Alternatively like for the other above mentioned reactors, the basic aqueous medium may be added to the gel after it has been removed from the belt reactor during transfer from the reactor to a hold tank, in the hold tank, during gel sizing for example in an extruder, or during a gel granulation step.

According to a preferred embodiment in the process of the present invention a reactor is used encompassing at least three zones, wherein the first zone is an initiation zone, the second zone is a gel phase zone and the third zone is a granulation zone, whereby the monomer mixture is fed to the initiation zone and the basic aqueous medium according to the present invention is fed to second and/or third zone. Especially when using a continuous kneader having two shafts, as discussed above, the inlet connection of the transfer line is installed at the feed end of the reactor such that the solution is fed to zone one of the reactor, such that it is at the inside of the reactor centrically between the two shafts to be homogenously mixed with the reaction mass in this zone. In a preferred embodiment of the present invention a pressure difference is applied between transfer line and reactor and the reactor is operated under subatmospheric pressure. The gas phase separates upon entry into the reactor from the liquid phase and is directed via the vacuum system and the vent system to further processing, as will be discussed below.

The reactor may be continuously charged with monomer solution at the rate of about 0.5 kg/h to about 5 kg/h, preferably about 1.2 kg/h to about 3.5 kg/h per liter of total reactor volume. The monomer mixture as fed to the reactor has usually a temperature in the range of about 4° C. to about 35° C. For economical reasons the temperature is preferably above about 20° C. This saves energy for cooling down the solution and the temperature of the reaction mass during polymerization can be reliably controlled by other means.

The following options can be used to control the total energy input into the system. There is the option of controlling the total heat of polymerization generated by accordingly selecting the type and adjusting the concentration of the monomers in the monomer solution. The temperature of the monomer feed can be provided within the temperature range as given above, steam can be injected into the initiation zone of the reactor and finally there is the option of heating via jacket and shafts of the reactor. This might be required if the monomer feed cools the initiation zone in the reactor too much so that the rate of initiation and polymerization drops too much, resulting in a too long residence time in the reactor required for sufficient monomer conversion.

Energy can be removed from the reaction mass by cooling via jacket and shaft and very efficient cooling is achieved by evaporation of parts of the water present in the reaction mass. Most efficient cooling is achieved by evaporation under reduced pressure in the reactor. Consequently, operating the reactor under subatmospheric pressure has, in addition to the above discussed effects of fast and safe separation of the gaseous phase upon entry of the monomer mixture into the reactor without any additional phase separating devices the benefit of an efficient temperature control. A considerable portion of the energy of the system is also removed by the gel as it is discharged from the reactor. The amount depends on the heat capacity of the gel and its temperature.

The monomer concentration is usually not used to control the reaction temperature. For economical reasons it is desirable to raise the concentration to the highest possible level which is usually given by the limit of solubility. So, for temperature control there are all the other options left. Most preferably a combination of the options is applied by which the desired temperature in the various zones of the reactor is preferably addressed. Preferably the reaction mass in the first zone of the reactor has a temperature in the range of about 50° C. to about 100° C., preferably about 65° C. to about 90° C., in the second zone a temperature (peak temperature) in the range of about 65° C. to about 110° C., preferably about 80° C. to about 100° C. and in the last zone a temperature below about 100° C., preferably below about 95° C. These temperatures in the various zones can be reliably adjusted by the fact that jacket and shaft of the reactor are divided into several segments in which the temperature can be individually adjusted. This enables the temperature control of the initiation zone and of the last zone of the reactor. The peak temperature which occurs somewhere in the second zone is preferably reliably controlled by evaporation under the corresponding pressure for the desired temperature.

The shafts of the reactor are preferably operated at a speed of about 50% of the operational limit. The shear forces generated by the kneading tools allow sufficient granulation of the hydro gel so that a free-flowing gel is obtained having a mass average gel particle size in the range of about 3 mm to about 5 mm containing a fraction of gel particles above about 6 mm of no more than about 30%. Due to the addition of the basic aqueous medium of the present invention the flowability of the gel is particularly improved.

The reaction mass needs to stay in the reactor until sufficient conversion has occurred, the gel is sized to the desired degree and no further temperature control is required. At this point the conversion has reached a degree of at least about 90%, more preferably about 95% and most preferred more than about 99%. This correlates to a residence time depending on the throughput in the range of about 3 min to about 40 min, more preferably from about 4 min to about 20 min. Throughputs in the range of about 0.5 kg/h to about 5 kg/h of monomer solution per liter of total reactor volume are possible.

The gel is discharged from a last zone of the reactor which is located at the opposite end with respect to the feed or initiation zone of the reactor. Using the preferred embodiment of the reactor the gel is wiped out of the reactor by the cleaning shaft over an adjustable weir through an opening in the housing at the side of the cleaning shaft.

It is preferable for smooth production conditions to have a buffer containment for polymer gel between the reactor and the next unit downstream of the process. In addition to maintaining a desirable quantity of buffer material the vessel also serves as a hold tank to allow further conversion of the polymer gel to a conversion of above about 99%, even more preferred of above about 99.5%. It furthermore provides an additional location where additives can be charged to the polymers and be mixed in. The design of that vessel is not critical as long as it provides tools for adequate agitation and for keeping up the desired temperature of the gel. Preferably the containment is insulated to keep the gel at the desired temperature, allows substantial plug flow and is designed such that the polymer gel can continuously and reliably be charged and discharged. The containment can be a vessel that is horizontally or vertically arranged, a single or multiple screw conveyor or a moving belt. The containment can serve multiple production line processes up- and downstream. In case several gel dryers are served with gel from one buffer vessel an adequate number of junctions are installed in order to properly divide the gel stream.

The resultant polymer is typically pre-sized and dried using means well known in the art. Suitable drying means include fluidized bed dryers, rotary dryers, forced air ovens, through-circulation vent dryers and belt dryers. In some instances drying will occur in two or more stages, i.e. multistage drying. Following the completion of drying the polymer is further sized to form particles, preferably having a weight average diameter of less than about 2 mm and more preferred less than about 1 mm. Preferably the final polymer product has an average particle size of at least about 300 μm.

After drying and sizing usually the superabsorbent polymer is classified, for example, by sieving in order to remove particles having a too low particle size which is not acceptable for the intended commercial use of the superabsorbent polymers.

These fines can be recycled to any point of the process of the present invention whereby it is a particular advantage of the process of the present invention when these fines can be recycled to the monomer mixture, as explained above.

Furthermore, it is desired that the dried particles may be heat treated or surface treated in order to improve the product properties, as is known in the prior art. For example, the dried particles may be heat treated in accordance with the procedures set forth in WO 93/05080 and/or U.S. Pat. No. 5,629,377. Such heat treatment is preferably carried out at a temperature of at least about 170° C., more preferably of at least about 180° C., and most preferably of at least about 190° C. Such heat treatment is preferably carried out at a temperature of less than about 250° C., more preferably less than 240° C. The method of heat treatment is not critical. For example, forced air ovens, fluidized bed heaters, paddle dryers and heated screw conveyors can be successfully employed. If desired, the heated polymer may be remoisturized for ease in handling. A way to improve absorptive properties of the polymer particles may be to surface-crosslink the polymer particles. Procedures for surface-crosslinking are well known in the art and described in, for example, U.S. Pat. Nos. 4,734,478 and 4,466,983. These procedures may increase the modulus and/or the absorbency under load of the polymer particles. Surface modification may be also achieved by incorporation of additives like aluminum salts or silica.

When, as discussed above, according to a preferred embodiment of the present invention the reactor is operated under subatmospheric pressure and temperature control applies evaporation of water condensates are generated in the process. The total volume of condensates generated by the polymerization reaction depends on the process conditions. These conditions determine the final energy balance and hence the part evaporation has in the temperature control system. The total amount of energy in the system is a balance of the energy streams which either add or remove energy from the system. Adding energy streams are the polymerization and the feed streams (depending on their temperature), heat transfer from the jacket into the reactor, dissipation of mixing energy and optionally steam injection. The energy removing streams are the energy of the gel discharged according to the given heat capacity of it and depending on the gel discharge temperature, heat transfer from the reactor to the jacket and energy consumed by evaporation. Under the above discussed preferred conditions the amount of water to be evaporated is in the range of about 8% to about 80% based on the water present in the reaction mass. It can be removed from the reactor and separately be treated or it can be condensed and either be taken back to the gel in the reactor or to any of the downstream steps of the process until the gel is dried. It, alternatively, can be recycled to any of the suitable upstream steps of the process, preferably to the first strip zone of the reactor together with the reductive component of the redox initiator or to the unit for the preparation of the monomer solution.

For economical reasons it would on one hand be preferable to remove the evaporated fraction of water from the gel in order to maximize the solids content of the gel and hence not to generate the need of evaporation of the condensates. It has, however, be found that recycling of at least a part of the condensate to the gel reduces its stickiness and thus improves the flow behavior. Surprisingly, it was discovered by the present inventors, that by recycling of the aqueous carbonate or hydrogen carbonate containing scrubber solution to the gel the flow behavior is even further improved compared to recycling the condensate.

Thus, according to a preferred embodiment of the present invention the condensate stream is applied for diluting the caustic to be used for the scrubber. The condensate contains acrylic acid as the main component in a concentration in the range of about 0.5% to about 2%. In addition there are traces of other organic acids, such as acetic acid and propionic acid Inhibitors, such as MEHQ if applied and derivatives and degradation products of it and also traces of metal ions, i.e. Fe ions which may result from the contact of the acid with metallic surfaces of equipment or from other sources may be present, as will be discussed below.

Contrary to the expectations in the art it has been surprisingly found, that a basic aqueous scrubber solution obtained in a continuous process for the preparation of superabsorbent polymers despite the presence of numerous impurities can be recycled to the gel in order to improve the flowability of the gel without compromising process stability and product quality.

Thereby the valuable components of the scrubber solution like monomer or polymer fines can be utilized and disposal costs minimized without negatively effecting the process and/or the product.

The invention will now be illustrated in more detail with reference to the following examples.

EXAMPLES

The product parameters reported in the examples and tables are measured as follows:

Analytical Methods Used for the Examples

CRC (Centrifuge Retention Capacity)
EDANA, STANDARD TEST: WSP 241.2 (05). This test is incorporated herein by reference.
Gravimetric Determination of Fluid Retention Capacity in Saline Solution After Centrifugation
Gel-Flow-Index (GFI)
This method is used for the assessment of the flow behavior of Superabsorbent gel as it is discharged from the reactor or the extruder. The flow characteristic is determined as the Gel Flow Index (GFI). It quantifies the flow of the gel granulate through a set of appropriate sieves, which are assembled to a sieve tower.
Equipment and Material
  Sieves having a diameter of 20 cm and mesh sizes of 25 mm, 20 mm, 16 mm, 10 mm and 8 mm
  A plastic tray (30 cm long, 25 cm wide, 5 cm high) to carry the sieve tower
  A 2-liter plastic bag
  A temperature-insulated box to take the sample in the bag during transport and short term storage and keep it at the desired temperature
  500 ml plastic beaker
  Balance
Procedure
  The sieves are stacked to form a sieve tower and placed in the plastic tray as shown in FIG. 1.
  A gel sample taken from the source from which the sample needs to be analyzed is placed into the plastic bag, which is immediately put into the temperature-insulated box to be kept at the desired temperature until measured. From the sample in the plastic bag a portion of 200 g are carefully weighed into the plastic beaker and spread onto the top sieve of the sieve tower. Care must be taken not to touch or press the gel and not to allow any vibration to the sieves to not influence the natural, gravimetric flow behavior of the gel.
  The gel sample is left for 2 minutes to flow through the sieves and thereafter, the portions of gel on the sieves are determined by weighing.
Calculation
  The weights of the gel portions on the various sieves respectively in the tray are fed into the following formula to give the weighed mass on the sieve ($W_{i\ weighed}$)

$$W_{i\ weighed} = w_i * \alpha_i / w_{tot} * 100$$

where $w_i$ represents the weight of the gel on the sieve, $\alpha_i$ represents a sieve related weighting factor, where the factor is 0 for the 25-mm sieve, 0.2 for the 20 mm sieve, 0.4 for the 16-mm sieve, 0.6 for the 10-mm sieve, 0.8 for the 8-mm sieve and 1.0 for the gel weight in the tray and $w_{tot}$ represents the total gel weigh-in.

The Gel Flow Index is finally obtained by taking the sum of the weighted portions.

$$GFI = \Sigma W_{i\ weighed}$$

For accuracy, the procedure is repeated and the GFI reported represents the average of two measurements.

Comparative Example 1

For comparative example 1 a twin-screw reactor type ORP 10 batch from List AG (CH) was used. Prior to filling the reactor with monomer solution it was provided with an inert gas atmosphere by sweeping nitrogen through the reactor and it was pre-heated to 50° C.

1687.4 g of acrylic acid (99.8% active) was neutralized to 70% with 2538.9 g of a 24% active aqueous solution of a NaOH and diluted with additionally 354.3 g of de-ionized water. The temperature of the mixture was always kept below 35° C. To this mixture 4.6 g (2700 ppm b. o. AA) of HE-TMPTA having on average 15 EO-units in the molecule and 10.12 g (6000 ppm b. o. AA) of PEG 600. The monomer solution was collected in a plastic container, and 140.3 gram of fines (6.5% b. o. AA) were dispersed in it. The container was equipped with a dip pipe through which the solution was de-oxygenated with the aid of a nitrogen stream for 15 minutes. Thereafter it was transferred to the reactor under exclusion of oxygen. During transfer 1.97 of a 30% active hydrogen peroxide solution (350 ppm active b. o. AA) and 50.6 g of a 5% active sodium persulfate solution (1500 ppm b. o. AA) were injected into the transfer line. Right before finishing the monomer transfer, 6.8 g of a 1% active ascorbic acid solution (40 ppm b. o. AA) were injected to the transfer line.

The initiation of polymerization occurred immediately, the temperature of the reaction mass rose and the temperature of the reactor (jacket and shaft heating) were set to 80° C. The reaction mass reached a maximal temperature of 70° C. 26 minutes after initiation and was held at this temperature for further 30 minutes. A nitrogen gas sweep stream passed the head-space of the reactor during the entire polymerization and hold period in order to exclude oxygen and to carry any vapor out of the reactor. No vapor condensate was recycled to the process. The pressure of the hydraulic drive of the reactor was recorded and its average was calculated from the time period starting at the point of initiation and ending with the time of discharge.

Thereafter, the gel was discharged from the reactor, sized in a meat grinder (from Bizerba) having a die plate with 8-mm holes. A portion of 800 grams of the ground gel was placed as a layer having a thickness of about 6 cm in a basket manufactured from a metal screen and adjusted in the sample chamber of the fluidized bed dryer, where it was dried in the upstream of the hot air having a temperature of 180° C. for 20 minutes. The obtained dry polymer was manually crushed, ground in a pilot size roll mill (from Bauermeister) and sieved to obtain a fraction having a particle size between 150 and 850 µm. The results are summarized in the following Table 2.

Comparative Example 2

Comparative example 1 was repeated except that the fines were added into the gel in the reactor 5 minutes before it was discharged from the reactor and homogeneously mixed in by continuing agitation.

Comparative Example 3

Comparative example 1 was repeated except that the fines were added in to the reaction mass in the reactor after the viscous reaction mass had started to granulate and was broken into coarse lumps and were homogeneously mixed in by continued agitation.

Comparative Example 4

Comparative example 2 was repeated except that the vapor leaving the reactor was condensed, collected (347 g) and recycled back to the gel in the reactor 5 minutes before it was discharged from the reactor and homogeneously mixed in by continuing agitation.

The results are summarized in Table 1.

Examples 1 and 2

The comparative examples 1 and 2 were repeated but additionally, 337.5 g of water was omitted in the recipe and instead replaced by the same weight of scrubber water (20% b. o. AA) as obtained from regular production. It was mixed into the gel in the reactor. The results are reported in Table 1.

TABLE 1

| Example # | Fines addition (8% b.o. AA) | Scrubber water addition (20% b.o. AA) | CRC (g/g) | GFI (prior/ after gel extrusion) |
|---|---|---|---|---|
| CE 1 | to monomer | Non | 41.5 | 58.7/20.2 |
| CE 2 | to gel (>95% conversion) | Non | 39.0 | 58.3/14.1 |
| CE 3 | gel (30-50% conversion) | Non | 38.0 | 43.3/13.1 |
| CE 4 | to gel | Condensate* to gel | 41.9 | 59.4/20.2 |
| E 1 | to monomer | to gel | 36.9 | 69/44.9 |
| E 2 | to gel | to gel | 39.0 | 64/38 |

*Condensate was used instead of scrubber water.

The results demonstrate that recycling the scrubber water to the gel in the reactor does not significantly influence the absorption capacity but does significantly improve the flowability of the gel in the reactor and even more of the gel after extrusion. Furthermore, the results show that adding water or an aqueous solution that is not basic or does not contain carbonate as in Comparative Example 4 only marginally improves the flowabilty of the polymer gel; whereas using the carbonate containing scrubber water as in Example 2 the flowability is considerably improved.

The invention claimed is:

1. A process for the production of a superabsorbent polymer comprising:
   (a) preparing an aqueous monomer mixture selected to provide after polymerization a superabsorbent polymer,
   (b) feeding said aqueous monomer mixture to a reactor,
   (c) subjecting said aqueous monomer mixture in the reactor to free-radical polymerization to obtain a superabsorbent polymer gel,
   (d) removing the superabsorbent polymer from the reactor, and
   (e) working-up the superabsorbent polymer removed from the reactor to obtain a final product,
   whereby a basic aqueous medium comprising carbonate, hydrogen carbonate, or combinations thereof, and an aqueous scrubber solution obtained from at least one off-gas stream removed from any stage of the process being subjected to scrubbing with a basic aqueous solution prior to venting is fed to the superabsorbent polymer gel.

2. The process according to claim 1, wherein working-up step (e) comprises:
(A) transferring the superabsorbent polymer gel to a subsequent process step according to (B) if at least one of the process steps according to (B) is performed;
(B) optionally any of the following steps and combinations thereof in any order:
(1) sizing the superabsorbent polymer gel;
(2) granulating the superabsorbent polymer gel;
(3) maintaining the superabsorbent polymer gel in a gel hold tank;
(C) transferring the superabsorbent polymer gel to a drying device; and
(D) drying the superabsorbent polymer gel,
the basic aqueous medium being fed to the superabsorbent polymer gel in any of the process steps defined in (c) and (e(A) to e(C)).

3. The process according to claim 1, whereby the reactor comprises at least three zones.

4. The process according to claim 3, wherein the first zone is an initiation zone, the second zone is a gel-phase zone and the third zone is a granulation zone, and wherein the aqueous monomer mixture is fed to the initiation zone via a transfer line.

5. The process according to claim 4, whereby said aqueous scrubber solution is recycled to the gel in the second zone of the reactor, the third zone of the reactor, or any combination thereof.

6. The process according to claim 1, whereby the at least one off-gas stream contains carbon dioxide resulting in a carbonate or hydrogen carbonate containing aqueous scrubber solution.

7. The process according to claim 6, further comprising:
introducing at least a part of the carbonate or hydrogen carbonate containing aqueous scrubber solution into the aqueous monomer mixture prior to entry into the reactor thereby forming a gas phase comprising carbon dioxide and at least a part of oxygen previously dissolved in the monomer mixture, said gas phase being dispersed in the liquid phase;
subjecting the mixture of said gas phase dispersed in said liquid phase to at least partial phase separation immediately prior to or after entry into the reactor; and
at least partially removing the separated gaseous phase as off-gas stream.

8. The process according to claim 1, whereby the free-radical polymerization is initiated by a redox initiator, and wherein the oxidative component of the initiator is added to the monomer mixture in step (a) and the reductive component of the initiator is added to the monomer mixture prior to entry of the monomer mixture into the reactor or directly to the reactor immediately after entry of the monomer mixture into the reactor.

9. The process according to claim 1, whereby the process is a continuous process and the monomer mixture is continuously fed to the reactor and the superabsorbent polymer is continuously removed from the reactor.

10. The process according to claim 1, whereby the reactor is selected from continuous kneaders and extruders or belt reactors.

11. The process according to claim 1, whereby the aqueous monomer mixture comprises at least one ethylenically unsaturated acid and at least one monomer bearing at least two ethylenically unsaturated groups.

12. The process according to claim 1, wherein the off-gas stream originates from:
vent streams from monomer storage tanks and monomer transfer lines;
vent streams from de-oxygenization of the monomer mixture;
vent streams from the reactor;
vent streams from superabsorbent polymer gel sizing;
vent streams from superabsorbent polymer gel drying;
vent streams from superabsorbent polymer product post-treatment operations; or
any combinations thereof.

13. The process according to claim 1, whereby the aqueous scrubber solution comprises:
alkali metal hydroxides;
alkali metal carbonates and/or hydrogen carbonates;
alkali metal salts of ethylenically unsaturated and optionally saturated acids;
superabsorbent polymer dust;
metal ions other than alkali metals; and
polymerization inhibitors, derivatives of polymerization inhibitors, degradation products of polymerization inhibitors, or combinations thereof.

14. The process according to claim 1, wherein the resultant superabsorbent polymer is surface modified by surface post-crosslinking, heat-treatment and/or by additives.

* * * * *